(12) United States Patent
Bauer

(10) Patent No.: US 7,267,307 B2
(45) Date of Patent: *Sep. 11, 2007

(54) RETAINING MEMBER

(75) Inventor: Christian Bauer, Karlsfeld (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 196 days.

This patent is subject to a terminal disclaimer.

(21) Appl. No.: 10/767,744

(22) Filed: Jan. 30, 2004

(65) Prior Publication Data

US 2004/0188569 A1 Sep. 30, 2004

(30) Foreign Application Priority Data

Feb. 18, 2003 (DE) ................. 103 06 904

(51) Int. Cl.
*F16L 3/08* (2006.01)

(52) U.S. Cl. ..................... 248/65; 248/67.7

(58) Field of Classification Search ............ 248/65, 248/67.7, 68.1, 74.2, 316.1, 316.7; 174/97, 174/99 R, 135; 24/458, 462, 531

See application file for complete search history.

(56) References Cited

U.S. PATENT DOCUMENTS

| | | | | |
|---|---|---|---|---|
| 3,126,184 A | * | 3/1964 | Kropp | 248/73 |
| 4,441,677 A | * | 4/1984 | Byerly | 248/74.3 |
| 4,467,988 A | * | 8/1984 | Kraus | 248/68.1 |
| 5,033,701 A | * | 7/1991 | Kraus | 248/68.1 |
| 5,458,303 A | * | 10/1995 | Ruckwardt | 248/74.2 |
| 5,460,342 A | * | 10/1995 | Dore et al. | 248/74.2 |
| 5,464,179 A | * | 11/1995 | Ruckwardt | 248/68.1 |
| 5,947,426 A | * | 9/1999 | Kraus | 248/74.2 |
| 6,070,836 A | * | 6/2000 | Battie et al. | 248/68.1 |
| 6,073,891 A | | 6/2000 | Humber | |
| 6,126,119 A | | 10/2000 | Giangrasso | |
| 6,290,201 B1 | * | 9/2001 | Kanie et al. | 248/636 |
| 6,708,931 B2 | * | 3/2004 | Miura | 248/68.1 |
| 2001/0019091 A1 | * | 9/2001 | Nakanishi | 248/68.1 |
| 2002/0063189 A1 | * | 5/2002 | Coudrais | 248/68.1 |
| 2002/0100623 A1 | * | 8/2002 | Thornton | 180/65.2 |
| 2004/0065785 A1 | * | 4/2004 | Miura et al. | 248/62 |
| 2004/0113027 A1 | * | 6/2004 | Nakanishi | 248/68.1 |
| 2004/0144897 A1 | * | 7/2004 | Maruyama | 248/68.1 |
| 2004/0217236 A1 | * | 11/2004 | Shibuya | 248/68.1 |

FOREIGN PATENT DOCUMENTS

| | | | |
|---|---|---|---|
| DE | 36 02 625 | 3/1987 | ............ 3/8 |
| DE | 4034545 A1 | 5/1992 | ............ 3/13 |
| DE | 296 20 300 | 3/1997 | ............ 3/22 |
| DE | 198 10 834 | 9/1998 | ............ 11/4 |
| DE | 198 57 853 | 6/2000 | ............ 3/22 |
| EP | 0483636 B1 | 12/1992 | |

(Continued)

*Primary Examiner*—A. Joseph Wujciak, III
(74) *Attorney, Agent, or Firm*—Lowe, Hauptman, Ham & Berner, LLP

(57) ABSTRACT

A retaining member in plastic, suited for retaining at least one line on a support, includes a basic body with a mounting area for mounting on the support and retaining area projecting from at least one side of the mounting area with at least one line seating for at least one line, and a resilient contact area projecting from the side of the mounting area that requires to be placed on the support.

12 Claims, 4 Drawing Sheets

| | FOREIGN PATENT DOCUMENTS | | | GB | 2129863 | 5/1984 | 2/22 |
|---|---|---|---|---|---|---|---|
| EP | 0666428 | 8/1995 | 37/8 | WO | 02/065009 | 8/2002 | 3/223 |
| EP | 0 838 626 | 4/1998 | 55/33 | | | | |
| EP | 1 036 966 | 9/2000 | 3/10 | * cited by examiner | | | |

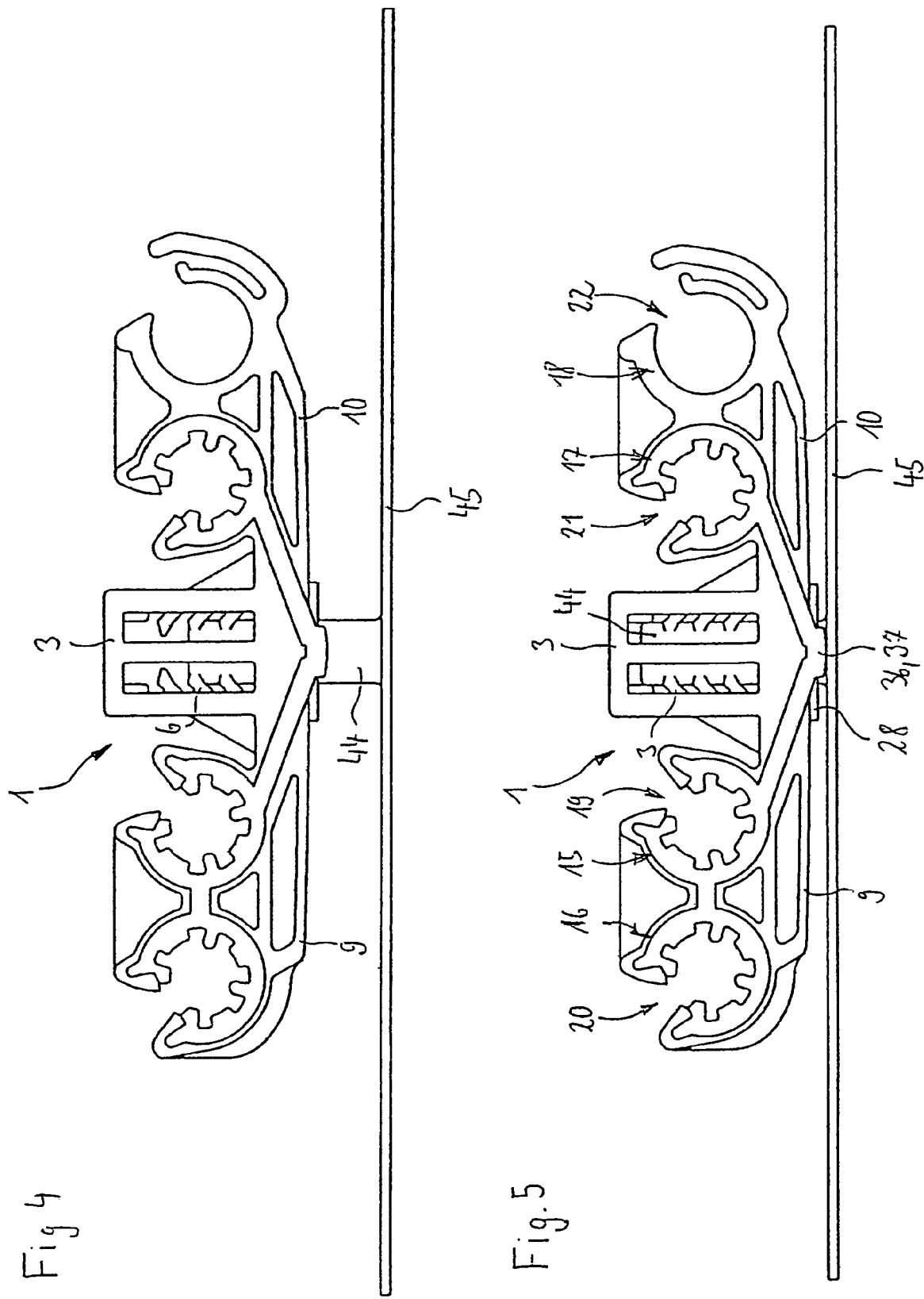

RETAINING MEMBER

FIELD OF THE INVENTION

The invention relates to a retaining member of a plastic material which is useful for holding lines on a support.

BACKGROUND OF THE INVENTION

When pipes, flexible tubes, and other lines through which pressure pulses are transmitted are mounted on a support by means of retaining members it is desirable to isolate the pressure pulses from the support. For example, this problem occurs in mounting brake lines on the body-in-white sheets of motor vehicles. Here, the transmission of pressure surges can cause vibrations in the audible range which can even be intensified by resonant bodies existing in the motor vehicle. Avoiding the transmission of the pressure surges onto the support from the lines is also called "acoustic isolation" in this application.

DE 40 34 545 A1 has made known a two-piece retaining member of a plastic for holding at least one tubular component that has an outer cup of a hard material mountable on a support via a retaining area and an inner cup of a soft material inserted therein which has at least one bearing point to receive the tubular component. To prevent the transmission of vibrations onto a support via the tubular component, the inner cup is mounted on the outer cup via an anchoring device on either side of the bearing point and a continuous clearance exists between the inner cup and the outer cup in the area of the bearing point.

EP 0 483 636 B1 has made known a retaining member of a plastic which has at least one bearing area disposed next to a retaining area for receiving at least one tubular component. To prevent the transmission of vibrations of a tubular component onto a support, the retaining member is of a three-piece design including a first part of hard material which exhibits the bearing area, a second part of a soft, damping material which is embedded therein, and a third part of a hard material which is embedded therein via a through hole and exhibits the retaining area.

The known retaining members still leave a great deal to be desired with regard to the isolation of the pressure surges transmitted from the support via the lines.

SUMMARY OF THE INVENTION

Accordingly, it is the object of the invention to provide a retaining element of a plastic which enables the pressure surges transmitted via the lines to be isolated better from the support.

The inventive retaining element of a plastic, which is useful for holding at least one line on a support, has
- a basic body with a mounting area for mounting on the support and a retaining area projecting from at least one side of the mounting area with at least one line seating for at least one line, and
- a resilient contact area projecting from the side of the mounting area that requires to be placed on the support.

When the inventive retaining member is mounted on a support the resilient contact are will spring in more or less. On the side of the retaining member that faces the support, the contact between the retaining member and the support is concentrated onto the contact area. As distinguished from the basic body, the contact area is designed as being resilient or more intensely resilient. Hence, the contact area exhibits a lower spring constant than does the basic body. Retaining members having a virtually rigid basic body are also incorporated. The resilient contact area significantly reduces the transmission of pressure surges onto the support. Moreover, the contact area maintains the retaining area at a distance from the support. The reduction of pressure surges is favoured by the relatively low spring constant of the contact area. Summarizing, the inventive retaining member considerably improves the acoustic isolation of the lines from the support.

The retaining member can be mounted on the support in different configurations. In an aspect, the mounting area has a seating oriented transversely to the contact area for a mounting pin or rivet and/or a mounting pin or rivet oriented transversely to the contact area. For example, the mounting area can have a seating for a welding bolt which is welded to the support. However, a mounting bolt or rivet can also be inserted or have been inserted into the seating for connection to the support. In addition, the mounting area can be fixedly joined to a mounting pin or rivet which is connectable to the support.

In an aspect, the seating has inwardly projecting lamellae of the basic body which serve for anchoring to a mounting pin or rivet.

In an aspect, the mounting area has a box-shaped or cage-shaped or cylindrical or block-shaped body. This is the way a body having a seating or a body having an integrally joined mounting pin or rivet can be designed with advantage.

In an aspect, retaining areas project from the two sides of the mounting area. This allows to mount the retaining member on the support in a more or less central location. The self-centering action of the mounting area (e.g. on the pin or rivet), the approximately rectangular orientation of the mounting area to the support, and the compensation of the forces acting onto two retaining areas by the lines distributed to either side favour the supporting action of the retaining member, primarily via the central contact area on the support.

In an aspect, each retaining area has a flat retaining arm and at least one clipping element disposed on a flat side of the retaining arm with a line seating.

In an aspect, the retaining arm is hollow in part.

In an aspect, the retaining area, on the side facing the support, has an increasing distance from the level of the side of the mounting area that requires to be placed on the support with an increasing distance from the mounting area.

The acoustic isolation is favoured by an extension as short as possible of the contact area in the direction of the retaining area. In an aspect, the contact area is disposed on a transverse central plane via a seating and/or a mounting pin or rivet. In an aspect, the contact area has contact elements on diametrically opposed sides of a seating and/or a mounting pin or rivet. In an aspect, the contact elements are two ribs extended in the direction of the retaining areas. In an aspect, the overhang of the contact area beyond the side of the mounting area that requires to be placed on the support decreases towards the retaining area. In an aspect, the contact area is of a cambered design.

In an aspect, the mounting area, on the side that requires to be placed on the support, has at least one rigid protrusion (if possible, about the central axis of a seating and/or a mounting pin or rivet having a small extension to the retaining areas) beyond which projects the contact area projects. When the non-rigid contact area undergoes heavy compression the rigid protrusion comes to bear thereon. In addition, the rigid protrusion provides for a contact located around the mounting centre even if the non-rigid contact area is completely compressed.

In an aspect, the protrusion is of a ring shape. The ring-shaped protrusion can extend around a seating and/or a mounting pin or rivet.

In an aspect, the overhang of the protrusion beyond the side of the mounting area that requires to be placed on the support decreases in the direction in which the retaining area extends.

Basically, the basic body and the contact are can be made of the same plastic material where an appropriate configuration can help in giving the basic body a higher spring constant and the contact area a lower spring constant. In an aspect, the rigid basic body is made of a rigid plastic material and/or the resilient contact area is made of a non-rigid plastic material or a rigid plastic material having a non-rigid nature. The different spring constants will then be caused by the plastic materials.

In an aspect, the line seating is formed in a substantially cylindrical, elastically expandable cup having an insertion slot. The cup is a clamping member into which the line can be snapped simply through the insertion slot. In an aspect, at least some part of the line seating has a lining made of a non-rigid plastic material. This helps achieve a further improvement to the acoustic isolation of the line from the support.

In an aspect, the linings of various line seatings and/or at least the lining of a line seating and the contact area are connected to each other via a duct filled with the non-rigid plastic material. The non-rigid plastic material can be fed via an injection point.

In an aspect, the contact area and/or the linings is/are manufactured from a thermoplastic elastomer. Thermoplastic elastomers allow for a low spring constant of the contact area and/or linings (low friction/low surface load of the contact areas (in case of compressed constructional space).

BRIEF DESCRIPTION OF THE DRAWINGS

The invention will be described in more detail below with reference to the accompanying drawings of an embodiment. In the drawings:

FIG. 4 shows the same retaining member while being positioned on a welding bolt in the same view;

FIG. 5 shows the same retaining member in one of the final mounting positions on the welding bolt in the same view.

DETAILED DESCRIPTION OF THE PREFERRED EMBODIMENTS

Figure 1:
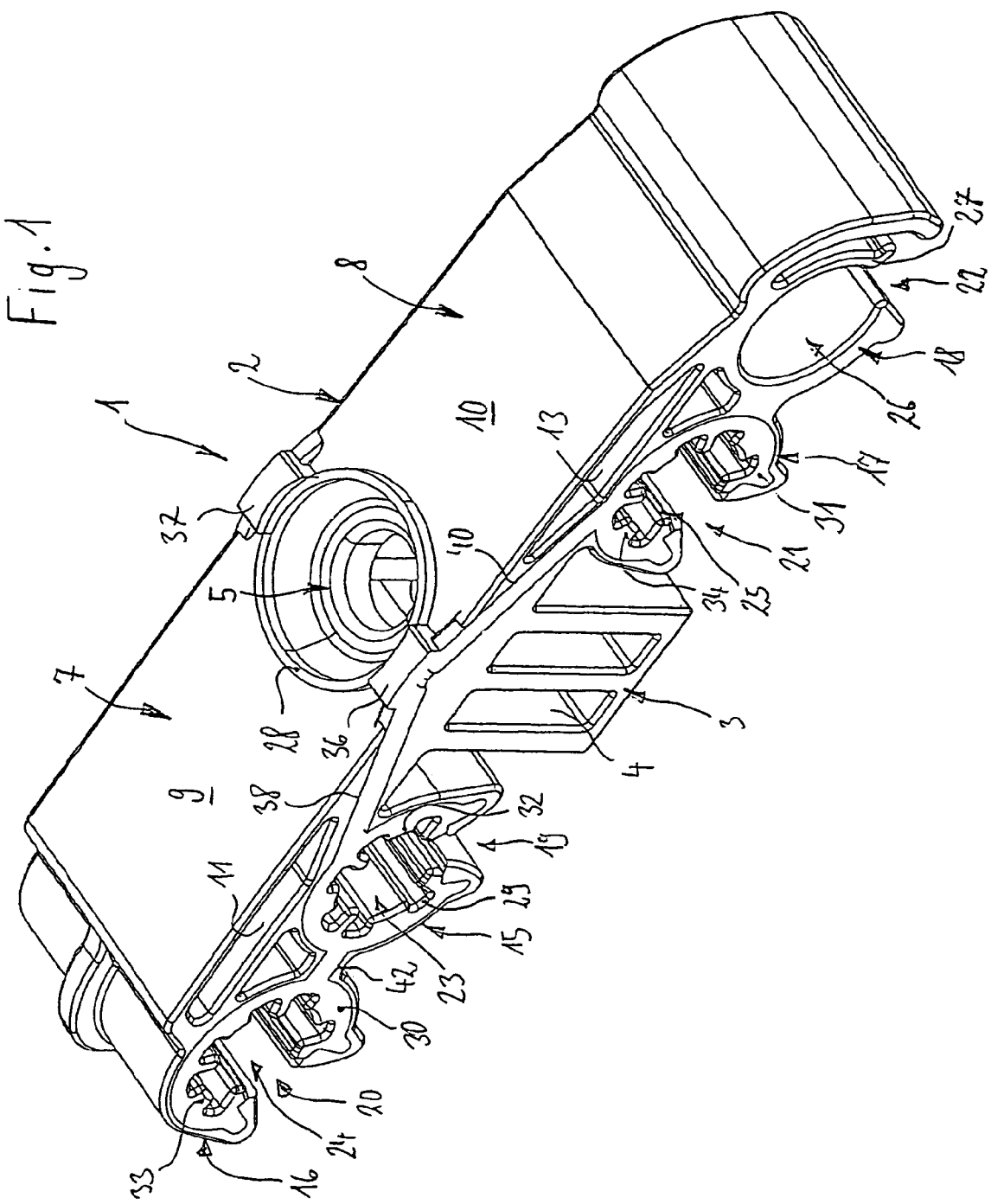
FIG. 1 shows the retaining member in a perspective view oblique to the side to be placed against the support.
Figure 2:
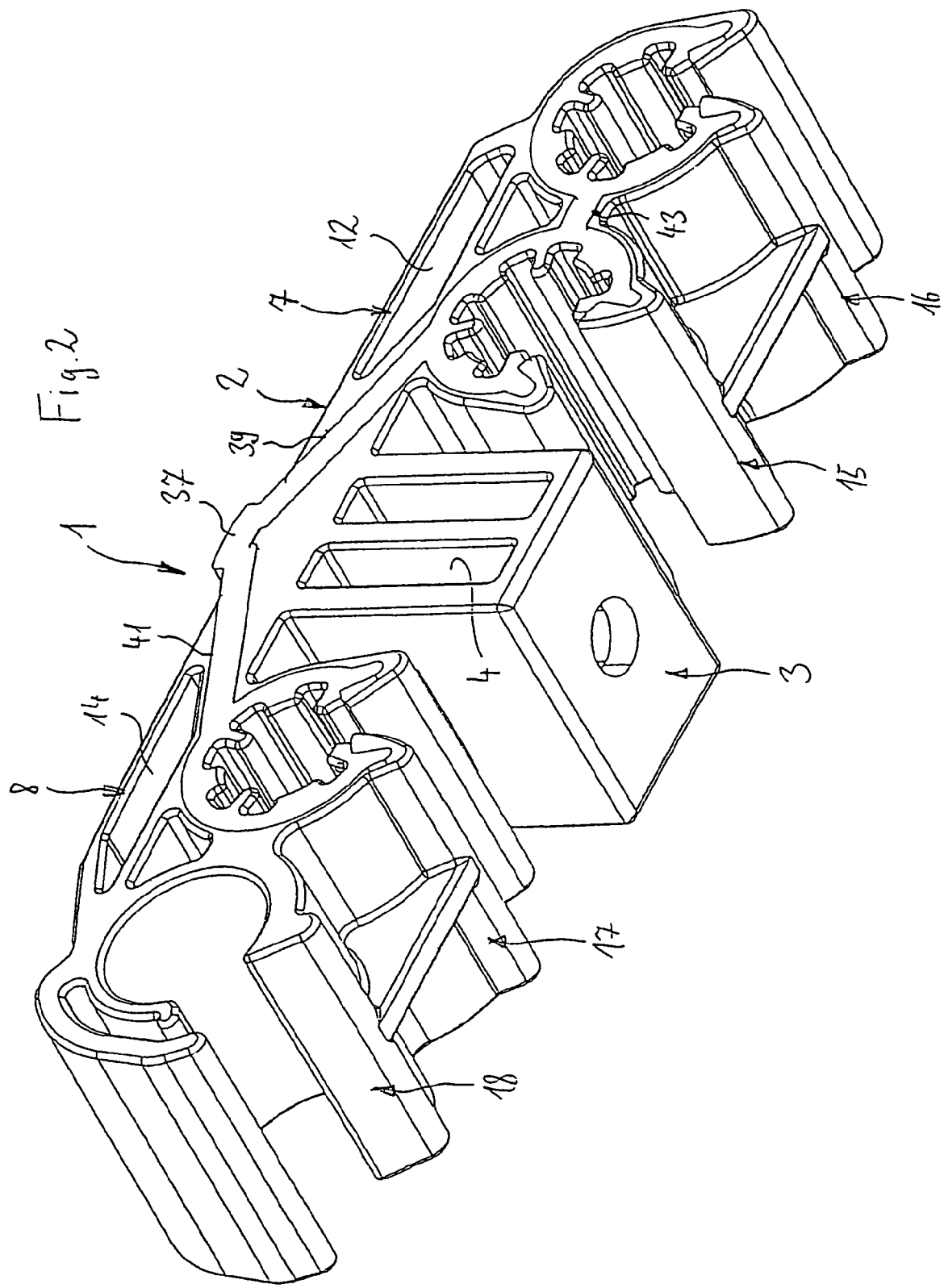
FIG. 2 shows the same retaining member in a perspective view oblique to the opposite side.

The inventive retaining member 1 has a basic body 2 of a rigid plastic material. For example, this is a PA (e.g. PA 6.6 or PA 6).

The basic body 2 comprises a central mounting area 3 which is formed in a box shape or cage shape. A seating 4 for mounting bolt is located in the mounting area 3. The seating 4 is accessible through a hole 5 in that side of the mounting area 3 which faces the support. The seating 4 has disposed therein two groups of parallel lamellae 6 which are on two opposed sides and are inclined towards the hole 5 on either side.

Retaining areas 7, 8 extend away from two opposed sides of the mounting area 3. The areas comprise an approximately plate-shaped retaining arm 9, 10 each which, starting from the two narrow sides, exhibit pocket-shaped cavities 11, 12, 13, 14. The retaining arms 9, 10 extend from the level of that side of of the mounting area 3 which is to be placed against the support.

The arms each carry two two clamping members 15 to 18 on the side to be faced away from the support. The members are designed as elastically expandable cups having an insertion slot 19 to 22 each. They house a line seating 23 to 26 each. The seating is confined by an additional clamping tongue 27 in the clamping member 18.

Finally, at the side to be placed against the support, the mounting area 3 has a ring-shaped protrusion 28, which extends around the hole 5.

The aforementioned components of the retaining member 1 are made of a rigid plastic material. They may be advantageously injection-moulded in a single operation.

The clamping members 15 to 17 have linings 29 to 31 of a non-rigid plastic material. The linings 29 to 31 have ribs 32 to 34 which project each from their insides. The ribs extend in parallel with the insertion slots 19 to 21 and, hence, in parallel with the lines to be inserted. Several of them are disposed in sets over the inner circumference of the clamping members 15 to 17. The clamping member 18 has no lining.

On diametrically opposed sides of the hole 5 and outside the ring-shaped protrusion 28, the mounting area 3 carries rib-shaped contact members 36, 37 on the side to be faced to the support. They extend. slightly towards the two retaining arms 9, 10. They project at an overhang father beyond the side to be faced to the support than does the ring-shaped projection 28. They are of a cambered design with their apex being approximately in the transverse central plane of the hole 5 and the overhang decreasing towards the retaining arms 9, 10. They together define a contact area 36, 37.

Two ducts 38 to 41 are located on the two outer surfaces of the basic body between the contact members 36, 37 and the linings 29, 31. Furthermore, the linings 29 and 30 are interconnected by channels 42, 43 in the sides of of the basic body 2. The linings 29, 31 and the contact members 36, 37 are made of the same non-rigid plastic material. The channels 38 to 43 are also filled with this plastic material. Thus, all of the non-rigid components of the retaining member 1 can be injection-moulded in a single step.

The whole of the retaining member 1 can be injection-moulded only in two steps in one or two injection moulding tools.

Figure 3:
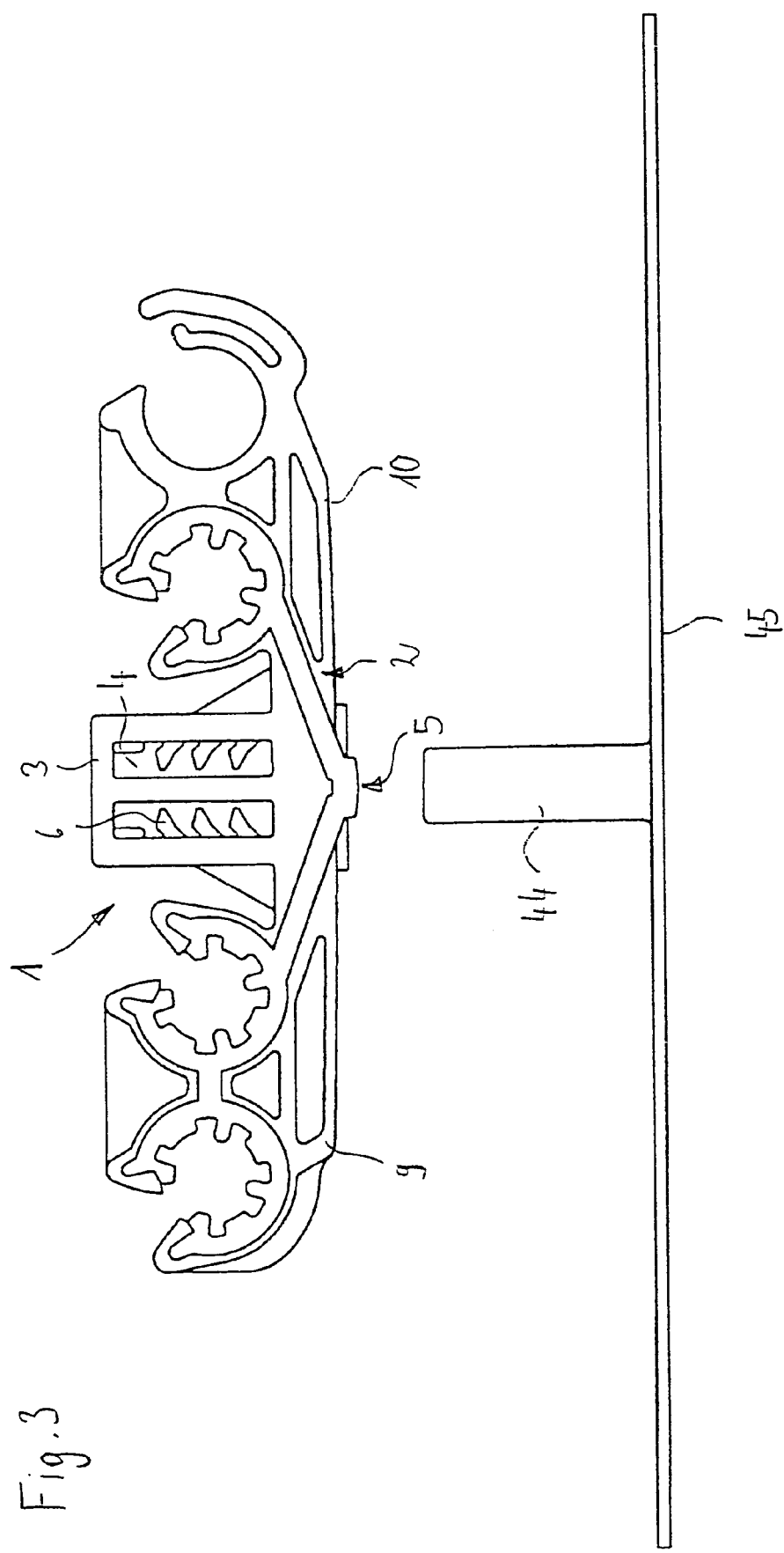
FIG. 3 shows the same retaining member in a side view prior to being positioned on a welding bolt.

The assembly and function of the retaining member 1 will be described below:

According to FIG. 3, the retaining member 1 aligns the hole 5 onto a welding bolt 44 which is welded perpendicularly onto a sheet-like support 45.

According to FIG. 4, the retaining member 1 is pushed onto the welding bolt 44. As a result, the lamellae 6 will be slightly bent apart.

According to FIG. 5, the retaining member 1 has seated its contact elements 36, 37 on the support 45 at the end of assembly. The contact elements 36, 37 are slightly compressed. The ring-shaped projection 28 is at a distance from the support 45. The retaining arms 9, 10 are at an even larger distance. The lamellae 6 prevent the retaining member 1 from slipping back from the welding bolt 44 and fix the retaining member at a firmly defined rerention force, in a cooperation with a contoured area (e.g. a thread profile) on the welding bolt 44.

Lines oriented perpendicularly to the plane of the drawing are pushed into the clamping members 15 to 18 through the insertion slots 19 to 22. The clamping members 15 to 18 receive lines through which pressure surges are transmitted. The clamping member 18 is destined for the reception of a line through which no pressure surges pass.

The pressure surges are attenuated by the non-rigid linings 29 to 31. This achieves an acoustic isolation of the lines from the support 45 that has not been attained hitherto.

The invention claimed is:

1. An one-piece retaining member for holding and supporting an elongated element from a support, said one-piece retaining member consisting of a single body which comprises:
   a holding portion being attachable to the support and comprising a recess for holding the elongated element therein, said holding portion having an underside adapted to face the support when said holding portion is attached to the support; and
   a resilient contact portion disposed on the underside of said holding portion to define a lowermost portion of said retaining member, said resilient contact portion being adapted to be placed between said holding portion and the support and to bear against the support when said holding portion is attached to the support, thereby minimizing vibration transmission from said holding portion to the support;
   wherein
   said holding portion comprises
      a base portion which is adapted to be attached to the support and on which said resilient contact portion is disposed; and
      at least an arm extending laterally from said base portion, said arm having therein the recess for holding the elongated element;
   said holding portion comprises two said arms extending from laterally opposite sides of said base portion;
   said base portion comprises a lower opening for receiving therein a pin of the support;
   said resilient contact portion comprises two resilient contact elements disposed on diametrically opposed sides of said opening; and
   each of said resilient contact elements has a convex lower surface extending from a lowermost point upwardly in opposite directions towards said arms.

2. The retaining member as claimed in claim 1, wherein each said arm extends laterally away from said base portion and obliquely upwardly away from said resilient contact portion, whereby the recess and the elongated element held therein can be placed further from the support than said base portion, avoiding undesired contact and vibration transmission between the elongated element and the support.

3. The retaining member as claimed in claim 2, wherein each said arm has a lower surface which is flat and slanted upwardly from the underside of said base portion; and the lower surfaces of said arm are slanted at an obtuse angle relative to each other.

4. The retaining member as claimed in claim 1, wherein said base portion further comprises an annular, downwardly extending wall which extends circumferentially of said lower opening and is positioned between said resilient contact elements, and
   a height of said annular wall is smaller than that of said resilient contact elements, whereby said annular wall may contact, in use, the support only after sufficient compression of said resilient contact elements.

5. The retaining member as claimed in claim 4, wherein said annular wall has, in a longitudinal direction of said arms, an extent greater than that of said resilient contact elements.

6. The retaining member as claimed in claim 1, wherein said holding portion and said resilient contact portion are made of the same plastic material, said resilient contact portion comprising a non-rigid feature which gives said resilient contact portion a spring constant lower than that of said holding portion.

7. The retaining member as claimed in claim 1, wherein said holding portion is made of a harder material and said resilient contact portion is made of a softer material, said harder and softer material being integrally molded into the single body of said one-piece retaining member.

8. The retaining member as claimed in claim 1, wherein said recess includes a resilient lining connected with said resilient contact portion by a connecting element made of the material of said lining.

9. The retaining member as claimed in claim 1, wherein said recess includes a resilient lining connected with said resilient contact portion by a connecting element, and wherein said lining, resilient contact portion and connecting element are all made of the same material.

10. The retaining member as claimed in claim 9, wherein the material of said lining, resilient contact portion and connecting element is softer than that of said holding portion.

11. A retaining member for holding and supporting an elongated element from a support, said retaining member comprising:
    a holding portion being made of a harder material, being attachable to the support, and comprising a recess for holding the elongated element therein; and
    a resilient contact portion being made of a softer material, being disposed on an underside of said holding portion, and being adapted to be placed between said holding portion and the support and to bear against the support when said holding portion is attached to the support, thereby minimizing vibration transmission from said holding portion to the support;
    wherein
    said recess includes a resilient lining connected with said resilient contact portion by a connecting element;
    said lining, resilient contact portion and connecting element are all made of said softer material;
    said connecting element extends through a thickness of the harder material of said holding portion, and is continuous to both the lining, which is disposed at an upperside of said holding portion, and the resilient contact portion, which is disposed at the underside of said holding portion; and
    said holding portion comprises
       a base portion which is adapted to be attached to the support and on which said resilient contact portion is disposed; and
       two arms extending laterally from opposite sides of said base portion, each said arm including at least one said recess and the resilient lining of said recess; and
    the linings of the recesses of said arms are connected to said resilient contact portion by two said connecting elements which are slanted with respect to each other and define a V shape.

12. A retaining member for holding and supporting an elongated element from a support, said retaining member comprising:

a holding portion being made of a harder material, being attachable to the support, and comprising a recess for holding the elongated element therein; and a resilient contact portion being made of a softer material, being disposed on an underside of said holding portion, and being adapted to be placed between said holding portion and the support and to bear against the support when said holding portion is attached to the support, thereby minimizing vibration transmission from said holding portion to the support;

wherein said recess includes a resilient lining connected with said resilient contact portion by a connecting element;

said lining, resilient contact portion and connecting element are all made of said softer material;

said connecting element extends through a thickness of the harder material of said holding portion, and is continuous to both the lining, which is disposed at an upperside of said holding portion, and the resilient contact portion, which is disposed at the underside of said holding portion; and said holding portion comprises a base portion which is adapted to be attached to the support and on which said resilient contact portion is disposed; and at least one arm extending laterally from a side of said base portion, said arm including two said recesses and the resilient linings of said recesses;

said recesses are connected with each other by a bridge portion spaced upwardly from said arm; and the linings of said two recesses are connected with each other by an auxiliary connecting element which is made of said softer material and embedded in said bridge portion.

* * * * *